US008879906B2

United States Patent
Patel et al.

(10) Patent No.: US 8,879,906 B2
(45) Date of Patent: Nov. 4, 2014

(54) OPTIMAL COMBINED 2R/3R REGENERATORS PLACEMENT METHOD FOR LINE NETWORK TOPOLOGIES IN OPTICAL WDM NETWORKS

(71) Applicant: NEC Laboratories America, Inc., Princeton, NJ (US)

(72) Inventors: Ankitkumar N. Patel, East Brunswick, NJ (US); Philip Nan Ji, Plainsboro, NJ (US); Ting Wang, West Windsor, NJ (US); Yoshiaki Aono, Tokyo (JP)

(73) Assignee: NEC Laboratories America, Inc., Princeton, NJ (US)

( * ) Notice: Subject to any disclaimer, the term of this patent is extended or adjusted under 35 U.S.C. 154(b) by 109 days.

(21) Appl. No.: 13/644,470

(22) Filed: Oct. 4, 2012

(65) Prior Publication Data
US 2013/0089323 A1    Apr. 11, 2013

Related U.S. Application Data

(60) Provisional application No. 61/548,299, filed on Oct. 18, 2011, provisional application No. 61/543,536, filed on Oct. 5, 2011.

(51) Int. Cl.
| | | |
|---|---|---|
| *H04B 17/00* | (2006.01) | |
| *H04J 14/00* | (2006.01) | |
| *H04J 14/02* | (2006.01) | |
| *H04B 10/079* | (2013.01) | |
| *H04B 10/299* | (2013.01) | |

(52) U.S. Cl.
CPC ............ *H04J 14/02* (2013.01); *H04B 10/0793* (2013.01); *H04B 10/07953* (2013.01); *H04B 10/299* (2013.01); *H04J 14/0227* (2013.01); *H04J 14/021* (2013.01); *H04J 14/0271* (2013.01)
USPC .................................. 398/25; 398/27; 398/58

(58) Field of Classification Search
CPC ............. H04B 10/079; H04B 10/0793; H04B 10/1795; H04B 10/07953; H04B 10/29; H04B 10/27; H04B 10/271; H04Q 2011/0079; H04Q 2011/0081; H04Q 2011/0086; H04Q 2011/009; H04J 14/0227; H04J 2014/0227; H04J 2203/0057; H04J 2203/0058; H04J 2203/0067
USPC ........................................ 398/27, 25, 58, 175
See application file for complete search history.

(56) References Cited

U.S. PATENT DOCUMENTS

| | | | |
|---|---|---|---|
| 8,644,703 B2* | 2/2014 | Mukherjee | 398/5 |
| 8,676,956 B1* | 3/2014 | Johnson et al. | 709/224 |
| 2010/0040365 A1* | 2/2010 | Kit Leung | 398/26 |
| 2014/0086570 A1* | 3/2014 | Rider et al. | 398/2 |

* cited by examiner

*Primary Examiner* — Dalzid Singh
(74) *Attorney, Agent, or Firm* — Joseph Kolodka

(57) ABSTRACT

A method for optimal combined 2R/3R regenerators placement for optical transmission includes determining an optimal placement of multiple 2R and 3R regenerators that minimizes bit error rate BER at a destination node, determining an optimal number of the 2R and 3R regenerators that minimizes a total cost while satisfying the BER at the destination node, and determining an optimal placement of the 2R and 3R regenerators along a route in the optical transmission.

10 Claims, 2 Drawing Sheets

OPTIMAL COMBINED 2R/3R REGENERATORS PLACEMENT METHOD FOR LINE NETWORK TOPOLOGIES IN OPTICAL WDM NETWORKS

RELATED APPLICATION INFORMATION

This application claims priority to both provisional application No. 61/543,299 filed Oct. 5, 2011 and provisional application No. 61/549,299 filed Oct. 18, 2012, the contents thereof are incorporated herein by reference

BACKGROUND OF THE INVENTION

The present invention relates generally to optical communications, and more particularly, to optimal combined 2R/3R regenerators placement method for line network topologies in optical WDM networks.

In optical transmission, the signal quality deteriorates due to the accumulation of linear and non-linear impairments as the signal traverses fiber spans and intermediate nodes. To keep the bit error rate (BER) below a certain threshold at the destination, the optical signal needs to be regenerated at intermediate nodes. Conventionally, optical-electrical-optical (O-E-O) 3R regenerators are used to achieve Reamplification, Reshaping, and Retiming of the signal. 3R regeneration may be complemented through the use of forward error correction (FEC) to further reduce bit errors.

In recent years, all-optical 2R regenerators have been developed, which provide an alternative solution for regenerating signals. These regenerators perform only reamplification and reshaping functions through optical layer processing, and therefore have lower cost and are more energy efficient due to the elimination of electrical modules. Another attractive feature is that 2R regenerators can regenerate multiple WDM channels simultaneously, further reducing hardware and operation cost. However, because all-optical 2R regenerators do not have clock recovery capability, and thus, cannot suppress timing jitter induced by intra-channel cross-phase modulation during transmission [2], the signal deteriorates faster than with 3R regeneration. Therefore, the solution that provides the best combination of performance and economy is one that utilizes both 2R and 3R regeneration. An open challenge is how to place 2R and 3R regenerators effectively in the network such that the benefits of all-optical regeneration can be leveraged maximally.

FIG. 1 shows the basic building blocks of an all-optical 2R regenerator [3]. A 2R regenerator consists of an optical amplifier that provides re-amplification capability, a filter that isolates a channel that needs to be regenerated, a passive reshaping nonlinear element that is responsible for reshaping the optical signal, and a variable attenuator that balances the output launched power between multiple optical channels.

Approximation of non-linear transfer function of a reshaping element by a piecewise linear function evolves the mean power and noise of an optical signal as shown in the following equations.

$$P_{out}^i = \gamma(P_{in}^i + P_{ASE}^i) + (1-\gamma)P_i$$

$$\sigma_{out_i}^2 = \gamma(\sigma_{in_i}^2 + \sigma_{ASE_i}^2)$$

where $P_{in}^i$ and $P_{out}^i$ represent the input and output mean power at signal level $i \in \{0, 1\}$ respectively. Similarly, $\sigma_{in,i}^2$ and $\sigma_{out,i}^2$ represent the input and output mean noise at signal level i. $P_{ASE}^i$ and $\sigma_{ASE,i}^2$ are the ASE noise power and ASE noise variance added by the amplifier. $\gamma$ is the nonlinear parameter, and $P_i$ is the power level at $i^{th}$ signal. Assuming a noise with Gaussian distributions, the BER at signal level 0 and 1 can be determined using an error function as shown in the equation immediately below. Finally, the average BER among different signal levels represents the BER of at the output of 2R regenerator.

$$BER_i = \left(\frac{1}{\sqrt{2\pi}}\right) \times \left(\frac{\sigma_{out_i}}{|P_{th} - P_{out}^i|}\right) \times e^{\frac{(P_{th}-P_{out}^i)^2}{2\sigma_{out_i}^2}}$$

The mixed 2R/3R regenerators' placement problem is formally defined as follows. We are given a physical topology G(V;E), where V is a set of ROADM nodes and E is a set of fibers connecting pairs of ROADM nodes. The distance between each pair of ROADM nodes (i, j) is represented in terms of the number of spans $K_{ij}$, where a span is a segment of a fiber between consecutive amplifiers. The costs of 2R and 3R regenerators are $C_{2R}$ and $C_{3R}$ respectively. Sensitivity of a receiver in terms of minimum acceptable BER is represented as $BER_{th}$. We need to place 2R and 3R regenerators along the given route $U_{sd}$ of the traffic demand R(s, d) between source s and destination d such that the cost is minimized. We assume that the network operates at a single line rate, and regenerators are only placed at ROADM nodes.

In a prior work, the author addresses the mixed 2R and 3R regenerator placement problem with the objective of minimizing the number of 3R regenerators irrespective of the costs of 2R and 3R regenerators, and proposes a greedy procedure. The procedure places a predefined finite number of 2R regenerators such that the total number of 3R regenerators is minimized. The running time for the greedy procedure increases factorially with the number of nodes in the network. Thus, the procedure may not be practical for large networks. Furthermore, the procedure may not result an optimal solution. In contrast as detailed below, the present invention addresses the mixed 2R and 3R regenerators placement problem using dynamic programming, and propose an effective procedure for the first time. The proposed procedure finds an optimal placement of 2R and 3R regenerators, and the time required to solve the problem increases polynomially with the network size that is significantly less than the procedure proposed in the prior work.

Accordingly, there is a need for optimal method to place 2R and 3R regenerators along the route of a connection such that the total cost is minimized.

BRIEF SUMMARY OF THE INVENTION

The present invention is directed to a method for optimal combined 2R/3R regenerators placement for optical transmission includes determining an optimal placement of multiple 2R and 3R regenerators that minimizes bit error rate BER at a destination node, determining an optimal number of the 2R and 3R regenerators that minimizes a total cost while satisfying the BER at the destination node, and determining an optimal placement of the 2R and 3R regenerators along a route in the optical transmission.

These and other advantages of the invention will be apparent to those of ordinary skill in the art by reference to the following detailed description and the accompanying drawings.

DETAILED DESCRIPTION

Figure 1:
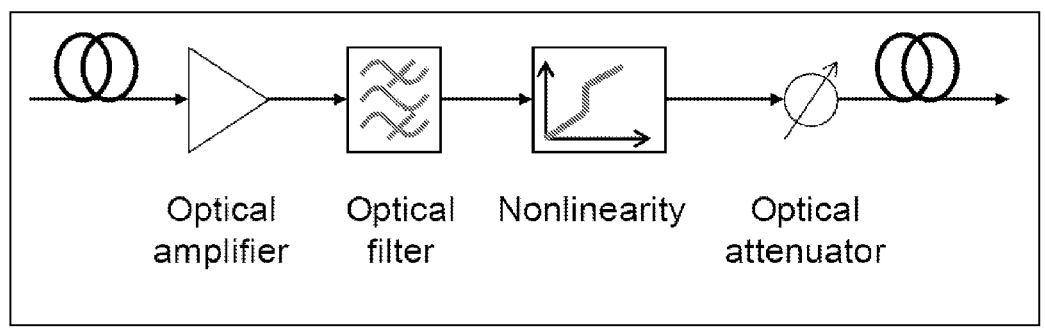
FIG. 1 shows an exemplary 2R regenerator.

The present invention is directed Since the combined 2R/3R regenerators placement problem satisfies optimal substructure (principle of optimality) property. The optimal solution along the route can be determined using an optimal solution of a segment of a route. Thus, in this invention, we propose the combined 2R/3R regenerators placement procedure using dynamic programming technique.

The mixed 2R/3R regenerators placement problem holds optical substructure (principle of optimality) property. Thus, the optimal solution of a given route is obtained from the optimal solution of a segment of the route. Let B[i, m, n] denote the BER at the output port of node i for a route from source s having m 2R regenerators and n 3R regenerators along the route. P[i, m, n] denotes the type of regenerator placed at node i of a route with m 2R and n 3R regenerators. P[i, m, n]=1 represents that no regenerator is placed at node i, P[i, m, n]=2 represents that a 2R regenerator is placed at node i, and P[i, m, n]=3 represents that a 3R regenerator is placed at node i. Initially, P[i, m, n] is initialized to 1, $\forall$ m, n, i$\in U_{sd}$, and B[i, m, n] is initialized to $\infty$, $\forall$ m, n, i$\in U_{sd}-\{s\}$. B[s, 0, 0] is initialized to 0, and B[s, m, n] is initialized to $\infty$, $\forall$ m$\neq$0; n$\neq$0. $BER_{(i-1,m,n)}^{(j,1,k)}$ denotes the BER at node k after placing m 2R regenerators and n 3R regenerators up to node i−1, with no regenerator placed at node j. $BER_{(i-1,m,n)}^{(j,1,k)}$ is obtained from the recorded BER, B[i−1, m, n], and considering the evolution of this BER at node k after no regenerator placement at node j. $BER_{(i-1,m-1,n)}^{(j,2,k)}$ denotes the BER at node k after placement of m−1 2R regenerators and n 3R regenerators up to node i−1 with a 2R regenerator placed at node j. $BER_{(i-1,m-1,n)}^{(j,2,k)}$ is obtained from the recorded BER, B[i−1, m−2, n], and considering the evolution of this BER at node k after placement of a 2R regenerator at node j. $BER_{(i-1,m,n-1)}^{(j,3,k)}$ denotes the BER at node k after placement of m 2R regenerators and n−1 3R regenerators up to node i−1 with a 3R regenerator placed at node i. $BER_{(i-1,m,n-1)}^{(j,3,k)}$ is obtained from the recorded BER, B[i−1, m, n−1] and considering the evolution of this BER at node k after placement of a 3R regenerator at node j, where i$\leq$j$\leq$k, and i; j; k$\in U_{sd}$. We denote $N_{si}$ as the number of nodes from source node s up to node i along the route $U_{sd}$, then the procedure applies the following recursive procedure to determine the optimal placement of regenerators for values of m and n, where m+n$\leq N_{si}$, m$\leq N_{si}$, and n$\leq N_{si}$ along the route $U_{sd}$.

The procedure constructs a three dimensional table B[i, m, n], where the first dimension i presents the index of a node along the route $U_{sd}$ connecting source s and destination d. the second dimension, m, is the number of 2R regenerators along the route, and the third dimension, n, represents the number of 3R regenerators along the route. Since a single regenerator is placed at a node, m+n$\leq N_{si}$, m$\leq N_{si}$, and n$\leq N_{si}$ constraints must be satisfied. From the known BER at the predecessor node i−1 along the route with m 2R regenerators and n 3R regenerators, where 0$\leq$m, n$\leq N_{si}$, the BER at the node i can be obtained as follows:

$$B[i, m, n] = \alpha \times BER_{(i-1,m,n)}^{(i,1,i)} + \beta \times BER_{(i-1,m-1,n)}^{(i,2,i)} + \gamma \times BER_{(i-1,m,n-1)}^{(i,3,i)}, \quad (1)$$

$$P[i, m, n] = \alpha \times 1 + \beta \times 2 + \gamma \times 3, \quad (2)$$

$$\alpha = 1 \text{ if } BER_{(i-1,m,n)}^{(i,1,d)} \leq \min\left(BER_{(i-1,m-1,n)}^{(i,2,d)}, BER_{(i-1,m,n-1)}^{(i,3,d)}\right) \quad (3)$$
$$= 0 \text{ otherwise}$$

$$\beta = 1 \text{ if } BER_{(i-1,m-1,n)}^{(i,2,d)} \leq \min\left(BER_{(i-1,m,n)}^{(i,1,d)}, BER_{(i-1,m,n-1)}^{(i,3,d)}\right) \quad (4)$$
$$= 0 \text{ otherwise}$$

$$\gamma = 1 \text{ if } BER_{(i-1,m,n-1)}^{(i,3,d)} \leq \min\left(BER_{(i-1,m,n)}^{(i,1,d)}, BER_{(i-1,m-1,n)}^{(i,2,d)}\right) \quad (5)$$
$$= 0 \text{ otherwise}$$

$$\alpha + \beta + \gamma = 1 \quad (6)$$

Given the solutions B[i−1, m,n], B[i−1, m−1, n], and B[i−1, m, n−1] of a segment of a route, $U_{s,i-1}$, the procedure finds the BER at the destination node, $BER_{(i-1,m,n)}^{(i,1,d)}$, $BER_{(i-1,m-1,n)}^{(i,2,d)}$, $BER_{(i-1,m,n-1)}^{(i,3,d)}$ by considering three potential scenarios, (1) no regenerator, (2) a 2R regenerator, and (3) a 3R regenerator, at node i respectively. Using Eq. 3 to Eq. 6, the procedure determines the placement of a regenerator at node i such that the BER at the destination node d is minimized. Based on the selection of a scenario, the BER at the output port of a node i is recorded in B[i, m, n], and the decision of placement is recorded in P[i, m, n] as shown in Eq. 1 and Eq. 2 respectively. The recursive procedure starts from the source node i=s, evaluates the placement of m 2R and n 3R regenerators at each intermediate node i for 0$\leq$m, n$\leq N_{si}$, and stops when the destination node is reached i=d. Finally, the table B is searched for values m and n such that m×$C_{2R}$+n× $C_{3R}$ is minimized and B[d, m, n]<=$BER_{th}$. The exact placement of regenerators can be found by searching the table P with the optimum value of $m_o$ and $n_o$ starting from the destination node d. If P[i, $m_o$, $n_o$]=1, then no regenerator is placed at node i. Similarly, if P[i, $m_o$, $n_o$]=2, then a 2R regenerator is placed at node i, and if P[i, $m_o$, $n_o$]=3, then a 3R regenerator is placed at node i. In the next step, the placement of a regenerator in the predecessor node i−1 is determined with the same value of $m_o$ and $n_o$ if no regenerator is placed at node i, or with values $m_o$−1 and $n_o$ if a 2R regenerator is placed at node i, or with values $m_o$, $n_o$−1 if a 3R regenerator is placed at node i.

Figure 2:
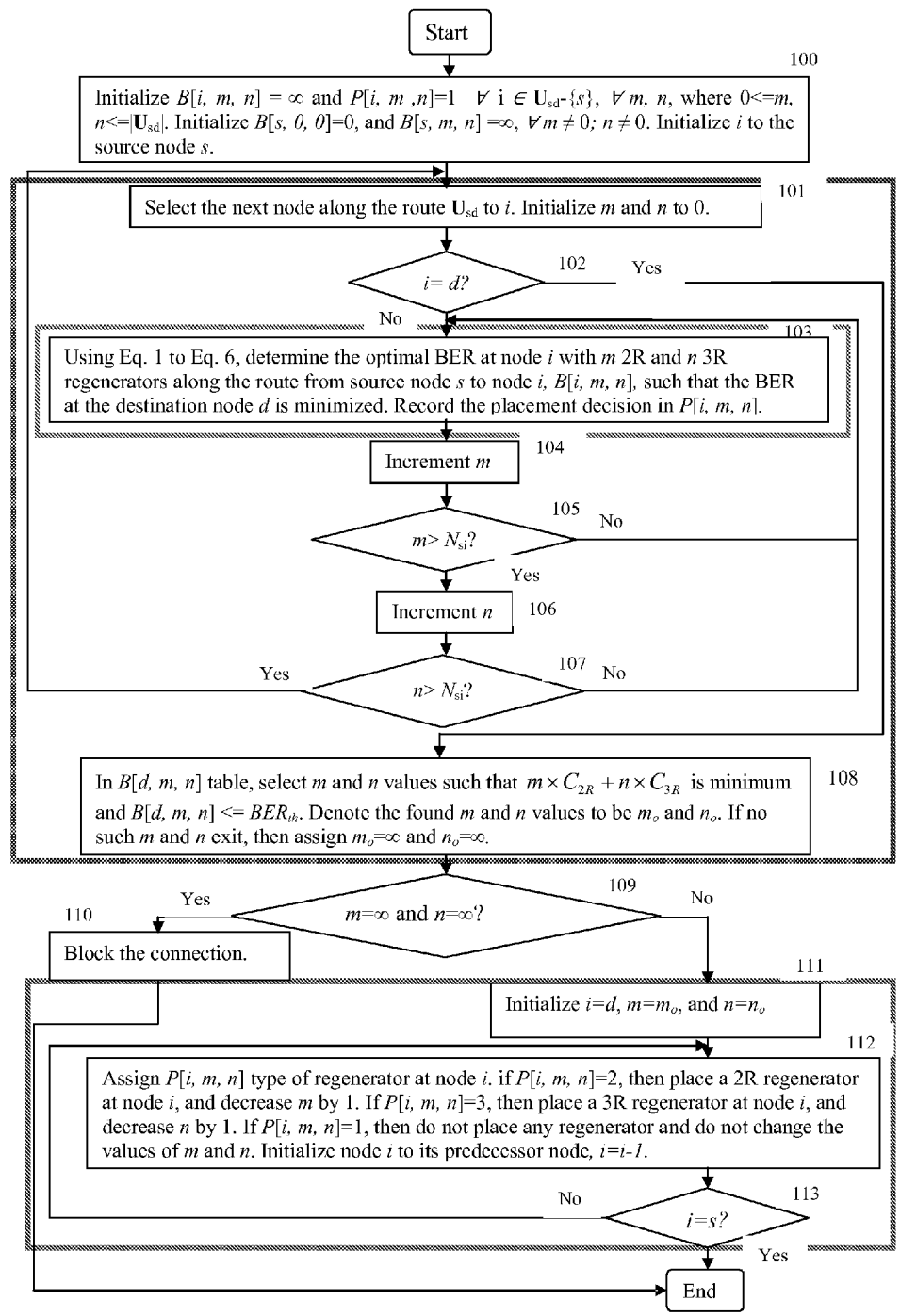
FIG. 2 shows a flow diagram for combined 2R/3R regenerators placement; in accordance with the invention.

In FIG. 2, there is shown a flowchart of the combined 2R/3R regenerators placement method, in accordance with the invention.

Initially 100, the inventive method initializes B[i, m, n]=$\infty$ and P[i, m, n]=1 $\forall$ i $\in U_{sd}-\{s\}$, $\forall$ m, n, where 0<=m, n<=|$U_{sd}$|. For the source node s, the procedure initializes B[s, 0, 0]=0, and B[s, m, n]=$\infty$, $\forall$ m$\neq$0; n$\neq$0. Iterator i is initialized to the source node s.

Then 101, iterators m and n are initialized to 0, and the procedure selects the next node along the route $U_{sd}$ and assigns to an iterator i.

Afterwards 102, the method checks whether the selected node is the destination node or an intermediate node. If the selected node is the destination node, then the procedure follows Step 108, otherwise the procedure follows Step 103.

Next 103, if the selected node is an intermediate node, then the procedure evaluates three potential scenarios of a regenerator placement at this node, (1) placement of no regenerator (2) placement of a 2R regenerator, or (3) placement of a 3R regenerator, and finds the BER at the destination nodes for each scenario, $BER_{(i-1,m,n)}^{(i,1,d)}$, $BER_{(i-1,m,n)}^{(i,2,d)}$, $BER_{(i-1,m,n-1)}^{(i,3,d)}$ respectively. The BER at the destination nodes $BER_{(i-1,m,n)}^{(i,1,d)}$ is determined using the recorded BER information at node i−1, B[i−1, m, n], and considering the BER evolution from node i−1 to the destination node d with no regenerator placement at node i. The BER at the destination nodes $BER_{(i-1,m-1,n)}^{(i,2,d)}$ is determined using the recorded BER information at node i−1, B[i−1, m−1, n], and considering the BER evolution from node i−1 to the destination node d with a 2R regenerator placement at node i. The BER at the destination nodes $BER_{(i-1,m,n-1)}^{(i,3,d)}$ is determined using the recorded BER information at node i−1, B[i−1, m, n−1], and considering the BER evolution from node i−1 to the destination node d with a 3R regenerator placement at node i. Among the three potential scenarios, a scenario is selected that minimizes the BER at the destination nodes, and in case of conflicts, a scenario is randomly selected among the conflicts using Eq. 3 to Eq. 6. Based on the selected scenario, the BER at the output port of a node i is determined, and recorded in the table B[i, m, n] using Eq. 1, and the selection of the scenario is also recorded in the table P[i, m, n] using Eq. 2. Then there is an increment of m 104.

Subsequently 105, there is a check of whether m is greater than the number of nodes between the source node S and the node i, $N_{si}$, along the route $U_{sd}$. If the answer is yes, then the procedure follows the step 106, otherwise it repeats the step 103. Then there is an increment of n 106.

There is a check 107 of whether n is greater than the number of nodes between the source node s and the node i, $N_{si}$, along the route $U_{sd}$. If the answer is yes, then the procedure follows the step 101, otherwise it repeats the step 103.

Then 108 there is an evaluation of the recorded BER at the destination node d, B[d, m, n], for all potential values of m and n, where 0≤m, n≤$N_{sd}$. The m and n are selected such that m×$C_{2R}$+n×$C_{3R}$ is minimum and B[d, m, n]≤$BER_{th}$. The selected m and n are assigned to $m_o$ and $n_o$ respectively. If no such m and n values exist that satisfy B[d, m, n]≤$BER_{th}$ condition, then ∞ is assigned to $m_o$ and $n_o$.

Next 109, there is a check as to whether $m_o$ and $n_o$ hold a finite value. If yes, then the procedure follows step 111, otherwise the procedure follows step 110.

In step 110, the connection is blocked because no regenerators placement solution exists that can transmit the optical channel within cutoff BER, $BER_{th}$, at the destination node d. The procedure terminates at this point.

In step 111, the iterator i is initialized to the destination node d, iterator m is initialized to $m_o$ and iterator n is initialized to $n_o$.

Then at step 112, the method assigns P[i, m, n] type of regenerator at node i. if P[i, m, n]=2, then a 2R regenerator is placed at node i, and m is decreased by 1. If P[i, m, n]=3, then a 3R regenerator is placed at node i, and n is decreased by 1. If P[i, m, n]=1, then no regenerator is placed at node i and values of m and n remain intact. Finally the procedure initializes i to its predecessor node, i=i−1.

In step 113, the method checks whether i is the source node s. If it is, then the procedure terminates, otherwise the procedure repeats step 112.

From the foregoing, it can be appreciated that the inventive is applicable in network design and to determine the placement of 2R and 3R regenerators under physical impairment constraints. The invention enables finding the solution in time that is polynomial of the input size. The inventive method is quick, and results a solution in real time. The inventive method always finds an optimal solution with minimum cost. The inventive method can be applicable for the placement of 3R regenerators with and without forward error correction FEC capability. The inventive method results in a near-optimal solution for mesh network topologies.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A computer implemented method for optimal combined 2R/3R regenerators placement for optical transmission, said method comprising the steps of:
   i) determining an optimal placement of multiple 2R and 3R regenerators that minimizes bit error rate BER at a destination node;
   ii) determining an optimal number of said 2R and 3R regenerators that minimizes a total cost while satisfying said BER at said destination node; and
   iii) determining an optimal placement of said 2R and 3R regenerators along a route in said optical transmission;
   wherein said step i) comprises dynamic programming that recursively solves determining a mixed 2R/3R regenerator placement that is optimal with a time required for determining said optimal placement increases polynomially with a number of nodes along said route that is lower than without said optimal placement.

2. The method of claim 1, wherein said step i) comprises a recursive process based on the following relationships $$B[i,m,n]=\alpha \times BER_{(i-1,m,n)}^{(i,1,d)}+\beta BER_{(i-1,m-1,n)}^{(i,2,d)}+\gamma \times BER_{(i-1,m,n-1)}^{(i,3,d)} \quad (1)$$

$$P[i,m,n]=\alpha \times 1+\beta \times 2+\gamma \times 3 \quad (2)$$

where $$\alpha=1 \text{ if } BER_{(i-1,m,n)}^{(i,1,d)} \leq Min(BER_{(i-1,m-1,n)}^{(i,2,d)}, BER_{(i-1,m,n-1)}^{(i,3,d)})$$

$$\alpha=0 \text{ Otherwise,} \quad (3)$$

$$\beta=1 \text{ if } BER_{(i-1,m-1,n)}^{(i,2,d)} \leq Min(BER_{(i-1,m,n)}^{(i,1,d)}, BER_{(i-1,m,n-1)}^{(i,3,d)})$$

$$\beta=0 \text{ Otherwise,} \quad (4)$$

$$\gamma=1 \text{ if } BER_{(i-1,m,n-1)}^{(i,3,d)} \leq Min(BER_{(i-1,m-1,n)}^{(i,2,d)}, BER_{(i-1,m,n)}^{(i,1,d)})$$

$$\gamma=0 \text{ Otherwise,} \quad (5)$$

$$\alpha+\beta+\gamma=1 \quad (6)$$

with i being an index of a node, BER being a bot error rate, node locations designated by i and j, m and n indicating a number of 2R and 3R regenerators, respectively, d being a destination on the route.

3. The method of claim 1, wherein said step ii) comprises evaluating the optimal placement of m 2R regenerators and n 3R regenerators for all potential values of m and n, where 0≤m, n≤$N_{sd}$ where $N_{sd}$ N denotes number of nodes from source node s to destination node d.

4. The method of claim 1, wherein said step iii) comprises recording a state of an optimal solution in a table P and traversing this matrix from said destination node to a source node to determine exact placement of said regenerators.

5. The method of claim 1, wherein said step ii) comprises using a optimal determination of a subproblem containing a segment of said route $U_{s,i-1}$, finding an optimal solution of a route $U_{si}$ by using an optimal solutions B[i−1, m, n], B[i−1, m−1, n], and B[i−1, m, n−1] and finding a bit error rate BER at the destination nodes $BER_{(i-1,m,n)}^{(i,1,d)}$, $BER_{(i-1,m-1,n)}^{(i,2,d)}$, $BER_{(i-1,m,n-1)}^{(i,3,d)}$ by considering three potential scenarios, (1) no regenerator, (2) a 2R regenerator, and (3) a 3R regenerator, at node i respectively;

with $U_{si}$ being a route from source node s to node i, i−1 indicating a predecessor node, m−1 and n−1 indicating decreasing by 1 the number of respective 2R and 3R generators.

6. The method of claim 5, wherein one of said potential scenario is selected that minimizes said BER at the destination node based on relationships $\alpha=1$ if $BER_{(i-1,m,n)}^{(i,1,d)} \leq \text{Min}(BER_{(i-1,m-1,n)}^{(i,2,d)}, BER_{(i-1,m,n-1)}^{(i,3,d)})$ $\alpha=0$ Otherwise, (3)

$\beta=1$ if $BER_{(i-1,m-1,n)}^{(i,2,d)} \leq \text{Min}(BER_{(i-1,m,n)}^{(i,1,d)}, BER_{(i-1,m,n-1)}^{(i,3,d)})$ $\beta=0$ Otherwise, (4)

$\gamma=1$ if $BER_{(i-1,m,n-1)}^{(i,3,d)} \leq \text{Min}(BER_{(i-1,m-1,n)}^{(i,2,d)}, BER_{(i-1,m,n)}^{(i,1,d)})$ $\gamma=0$ Otherwise, (5)

$\alpha+\beta+\gamma=1$ (6).

7. The method of claim 6, wherein said selected scenario said step ii) includes finding said BER at an output port of a node i and recording said BER in B[i, m, n], and said selected scenario in P[i, m, n] based on $B[i,m,n]=\alpha \times BER_{(i-1,m,n)}^{(i,1,i)}+\beta \times_{(i-1,m-1,n)}^{(i,2,i)}+\gamma \times BER_{(i-1,m,n-1)}^{(i,3,i)}$ and $P[i,m,n]=\alpha \times 1+\beta \times 2+\gamma \times 3$, respectively, B[i,m,n] being BER information at node i with m 2R and n 3R generators, and P[i,m,n] being a table of recorded placement decisions for respective BER information.

8. The method of claim 7, wherein said step ii) is started at said source node and recursively repeated at each intermediate node for m number of 2R regenerators and n number of 3R regenerators for $0 \leq m$, $n \leq N_{si}$ and $m \leq m_g$, and $n \leq n_g$ until the destination node is reached, where $N_{si}$ denotes a number of nodes from source node s up to node i, $m_g$ and $n_g$ being a given number of 2R and 3R generators, respectively.

9. The method of claim 1, wherein said step i) comprises evaluating said optimal placement of m number of 2R regenerators and n number of 3R regenerators for all potential values of m and n, where $0 \leq m$, $n \leq N_{sd}$, and finally selecting said value of m and n that minimizes a total cost of signal regeneration along the route, where $N_{sd}$ denotes number of nodes from source s to destination d.

10. The method of claim 1, wherein said step ii) comprises that exact placement of said 2R/3R regenerators is found by traversing a table P starting from said destination node with $m_o$ number of 2R regenerators and $n_o$ number of 3R regenerators, where $m_o$ and $n_o$ are initial iterator values.

* * * * *